US005443164A

United States Patent [19]

Walsh et al.

[11] Patent Number: 5,443,164

[45] Date of Patent: Aug. 22, 1995

[54] PLASTIC CONTAINER SORTING SYSTEM AND METHOD

[75] Inventors: Casey P. Walsh; Philip L. Hoffman; William S. Drummond; H. Parks Squyres, all of Medford, Oreg.

[73] Assignee: Simco/Ramic Corporation, Medford, Oreg.

[21] Appl. No.: 105,349

[22] Filed: Aug. 10, 1993

[51] Int. Cl.[6] .......................... B07C 5/00; G01N 21/00

[52] U.S. Cl. .................................... 209/580; 209/587; 209/588; 209/644; 209/938; 356/240; 356/445; 250/223 B; 198/836.1

[58] Field of Search ............... 209/559, 562, 564, 565, 209/576, 577, 580–582, 587, 588, 644, 938, 939; 356/239, 240, 365, 428, 445; 250/223 B, 223 R; 198/836.1, 836.4

[56] References Cited

U.S. PATENT DOCUMENTS

| | | | |
|---|---|---|---|
| 3,721,501 | 3/1973 | Atkinson et al. | 356/201 |
| 3,777,877 | 12/1973 | Piper | 198/836.1 X |
| 3,928,184 | 12/1975 | Anschutz | 209/644 X |
| 4,207,985 | 6/1980 | Lockett et al. | 209/564 |
| 4,280,625 | 7/1981 | Grobbelaar et al. | 209/582 |
| 4,617,111 | 10/1986 | Grimm et al. | 209/4 |
| 4,844,351 | 7/1989 | Holloway | 241/19 |
| 4,919,534 | 4/1990 | Reed | 356/73 |
| 5,041,996 | 8/1991 | Emering | 364/550 |
| 5,085,325 | 2/1992 | Jones et al. | 209/580 |
| 5,115,987 | 5/1992 | Mithal | 209/930 X |
| 5,134,291 | 7/1992 | Ruhl, Jr. et al. | 209/587 X |
| 5,135,114 | 8/1992 | Satake et al. | 209/558 |
| 5,141,110 | 8/1992 | Trischan et al. | 209/524 |
| 5,150,307 | 9/1992 | McCourt et al. | 364/478 |
| 5,273,166 | 12/1993 | Sawamura | 209/587 |
| 5,314,072 | 5/1994 | Frankel et al. | 209/588 X |
| 5,318,172 | 6/1994 | Kenny et al. | 209/588 X |

FOREIGN PATENT DOCUMENTS

| | | | |
|---|---|---|---|
| 554850 | 8/1993 | European Pat. Off. | 209/588 |
| 3520486 | 12/1986 | Germany | 209/587 |
| WO92/16312 | 10/1992 | WIPO . | |

*Primary Examiner*—William E. Terrell
*Assistant Examiner*—Tuan N. Nguyen
*Attorney, Agent, or Firm*—Stoel Rives Boley Jones & Grey

[57] ABSTRACT

A plastic container sorter (10) moves labeled plastic containers (14, 20, 48, 54, 58) of various colors and transparencies through an inspection zone (18). A pair of line-scanning color cameras (22, 24) capture respective transmittance and reflectance images of the containers and generate raw transmittance and reflectance image data. The raw container data are digitized, normalized, and binarized to provide accurate transmittance and reflectance container RGB image data and binarized image data for differentiating container image data from background data. Container sorting entails eroding (120) the binarized transmittance image and merging (122) the eroded image with the transmittance image data to yield a transmittance image. The eroded transmittance image is analyzed (124, 126) to determine whether the container is opaque. If the container is opaque, color analysis proceeds by analyzing the reflectance image data. If, however, the container is not opaque, transmittance image data are used to classify the container as green transparent (140), translucent (142), or clear transparent (142). Classified containers are transferred to an ejection conveyor (46). Side discharge of a classified container is effected by an air ejector (64) blast that is timed in response to sensing a particular container adjacent to an appropriate side discharge station (60).

17 Claims, 12 Drawing Sheets

PLASTIC CONTAINER SORTING SYSTEM AND METHOD

TECHNICAL FIELD

This invention relates to inspection and sorting systems and more particularly to an apparatus and a method for inspecting and sorting plastic containers by combinations of their light transmittance and reflectance characteristics, and for avoiding sorting errors caused by labels affixed to the containers.

BACKGROUND OF THE INVENTION

Growing environmental awareness has developed a market need for recycling plastic items. Such items are made from nonrenewable petrochemical resources, consume diminishing landfill space, and decompose very slowly. The market for recycled plastic is cost sensitive, and its ultimate size, success, and profitability result from the degree to which automated systems can sort a wide variety of plastic items and, in particular, plastic containers such as beverage bottles. Plastic container sorting has value because containers consume an inordinate portion of landfill volume.

Systems and methods are already known for sorting plastic items by size, color, and composition. In particular, U.S. Pat. No. 5,150,307 for a COMPUTER-CONTROLLED SYSTEM AND METHOD FOR SORTING PLASTIC ITEMS describes a sorting system in which baled plastic items, including containers, are broken apart into pieces, singulated on a split belt, and spun to lengthwise orient them for inspection by a length-detecting photocell array and an RGB color reflectance imaging camera. When the length is known, the center of each item is estimated so that most background data can be eliminated from the RGB reflectance image to speed up a time-consuming composition and color analysis. Reflectance images are subject to color contamination by labels, so the system performs an image grid analysis by which an image edge is located and the dominant RGB color is determined for each grid element located along the image edge. The item edge is assumed to include a minimum of color-contaminating label data. Item discharge utilizes a discharge conveyor position-synchronizing rotopulse, an item-indicating photoeye, an item-sorting mechanical distribution gate, and an item-discharging air ejector.

Such a sorting system is costly, overly complex, and prone to unreliability. Spinning items to achieve the lengthwise orientation increases the probability that adjacent items can be knocked into misalignment. Length and center determination, coupled with background elimination, edge determination, and grid analysis, is an overly time-consuming color analysis method that is subject to edge-induced color errors. Moreover, using only a reflectance image does not provide for optimal analysis of transparent and translucent items. Finally, because they are light and have a variety of shapes and sizes, plastic containers tend to float, roll, and shift position easily on a conveyor belt. Even though the above-described sorting system can handle plastic containers, it is needlessly complex, potentially unreliable, and therefore not optimally cost effective for sorting plastic containers.

U.S. Pat. No. 5,141,110 for a METHOD FOR SORTING PLASTIC ARTICLES describes using polarized light and crossed linear polarizers to classify the composition of transparent or translucent plastic articles as either polyethylene terephthalate ("PET") or polyvinyl chloride ("PVC"). Color analysis entails using an unacceptably slow mechanically positioned color filter technique. Opaque plastic articles are inspected with scattered and/or refracted X-rays, a known hazardous technique. The patent does not describe how color analysis is accomplished for opaque articles. In any event, proper inspection is said to require delabeling or otherwise avoiding labels, but no way of avoiding labels is described.

U.S. Pat. No. 4,919,534 for SENSING OF MATERIAL OF CONSTRUCTION AND COLOR OF CONTAINERS describes using two wavelengths of polarized light to determine the composition and color of transparent and translucent containers. In particular, determining the composition as glass or PET and further determining color entails calculating a difference in the transmitted intensity for polarized light at each of the two wavelengths, normalizing by the sum of the transmitted intensities, and using the normalized difference as a color index for characterizing the color of the container. Labels are considered opaque and are, therefore, ignored. Opaque containers cannot be analyzed by this technique.

U.S. Pat. No. 5,085,325 for a COLOR SORTING SYSTEM AND METHOD, assigned to the assignee of this application, describes using line-scanning cameras to sort moving articles on the basis of reflected RGB colors of visible light. Colorimetric accuracy is ensured by normalizing the light sensitivity of each camera sensor element, digitizing each RGB pixel value, and using the digitized value as an address into a color lookup table ("CLUT") that stores predetermined accept/reject data. The CLUT address is an 18-bit word formed by concatenating together the six most significant bits of each R, G, and B normalized and digitized color data. Such color data are said to be in a three-dimensional color space. CLUT output data can be size classified by a filter lookup table ("FLUT") and/or image processed in an image memory. Statistical- and histogram-based methods for loading the CLUT and FLUT with accept/reject and filtering data are also described. This system is primarily used to detect spot defects, such as eyes, in opaque articles, such as potato strips.

What is needed, therefore, is a simple, cost-effective plastic container sorter that is capable of accurately classifying labeled containers of any size, opacity, transparency, color, or orientation. Moreover, plastic containers are positionally unpredictable because their shape and light weight allows them to slip, roll, and slide during inspection. Therefore a simple and reliable system is needed for tracking and ejecting the classified containers.

SUMMARY OF THE INVENTION

An object of this invention is, therefore, to provide an apparatus and a method for sorting plastic containers by degree of transparency and color.

Another object of this invention is to provide an apparatus and a method for removing edge and label color contamination from color sorting decisions.

A further object of this invention is to provide an apparatus and a method for accurately sorting moving articles that are positionally unstable.

Still another object of this invention is to provide a cost-effective plastic container sorter having improved sorting speed, accuracy, and reliability.

A sorting apparatus and method according to this invention entails moving labeled or unlabeled plastic containers of various colors and transparencies across an inspection zone. A pair of line-scanning color cameras capture transmittance and reflectance images of the containers and generate respective raw transmittance and reflectance image data. The raw container image data are digitized, normalized, processed, and binarized to provide accurate transmittance and reflectance container image data together with binarized image data for differentiating container image data from background data.

Container sorting entails eroding the binarized transmittance image and merging the eroded image with the normalized transmittance image data to yield an eroded transmittance image that is free of noise and edge color effects. The eroded transmittance image is analyzed to determine whether the container is opaque. If the container is opaque, color analysis proceeds by using the reflectance image data. The binarized reflectance data are twice eroded, and the once and twice eroded images combined to yield a binary trace ring. The binary trace ring is merged with the normalized reflectance image data to yield a color trace ring that is free from noise, color edge effects, and most label color contamination. The opaque container color is the average RGB color of the color trace ring. If, however, the container is not opaque, normalized transmittance image data are used to classify the container as green transparent, translucent, or clear transparent.

Classified containers are transferred to an ejection conveyor having multiple side discharge stations having associated container sensors and air ejectors. Side discharge of a particular classified container is effected by an air ejector blast that is timed in response to sensing the particular container adjacent to the appropriate side discharge station.

Additional objects and advantages of this invention will be apparent from the following detailed description of a preferred embodiment thereof which proceeds with reference to the accompanying drawings.

DETAILED DESCRIPTION OF PREFERRED EMBODIMENT

Figure 1:
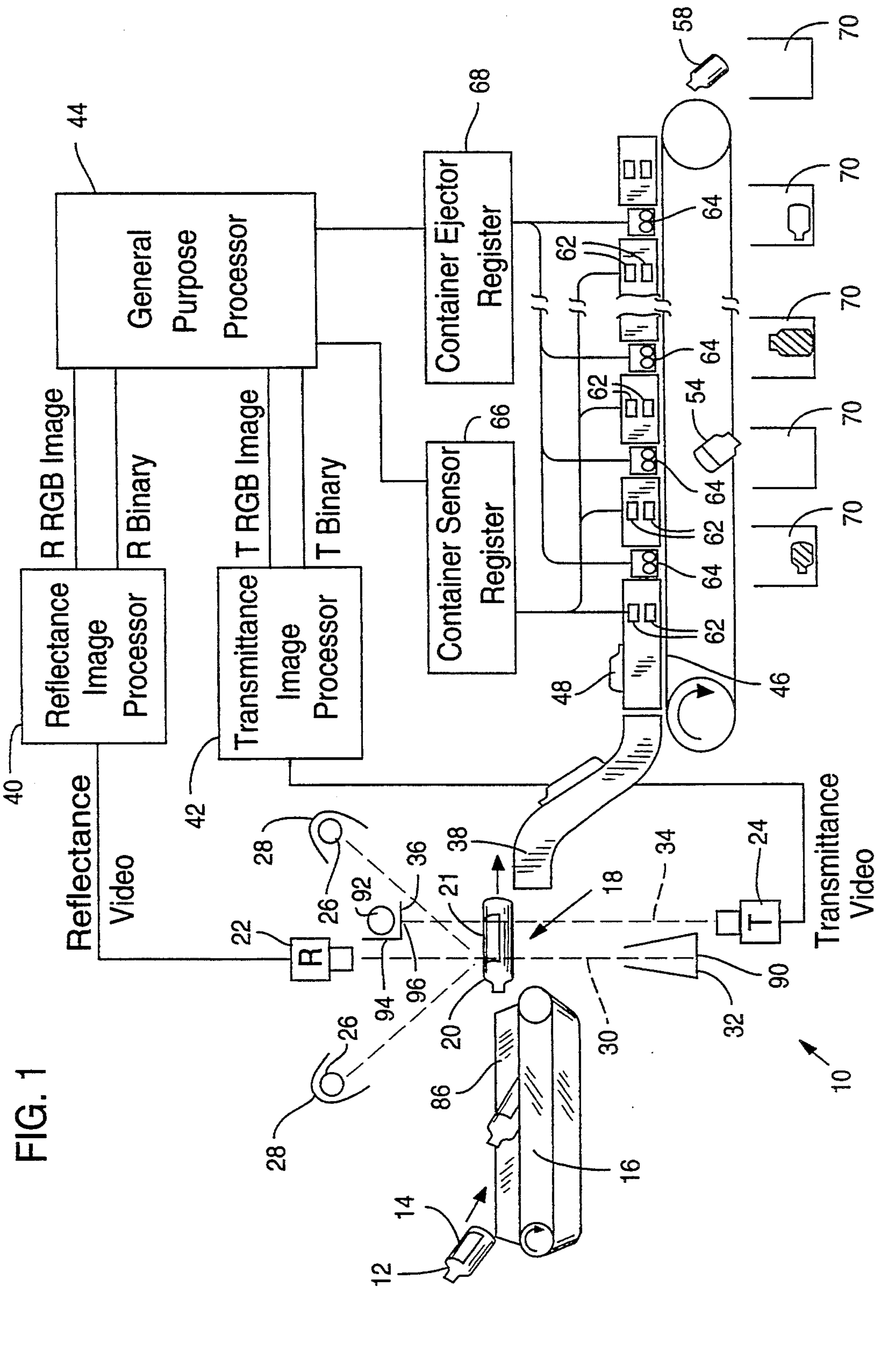
FIG. 1 is a simplified schematic side elevation view of a plastic container sorter according to this invention.
Figure 2:
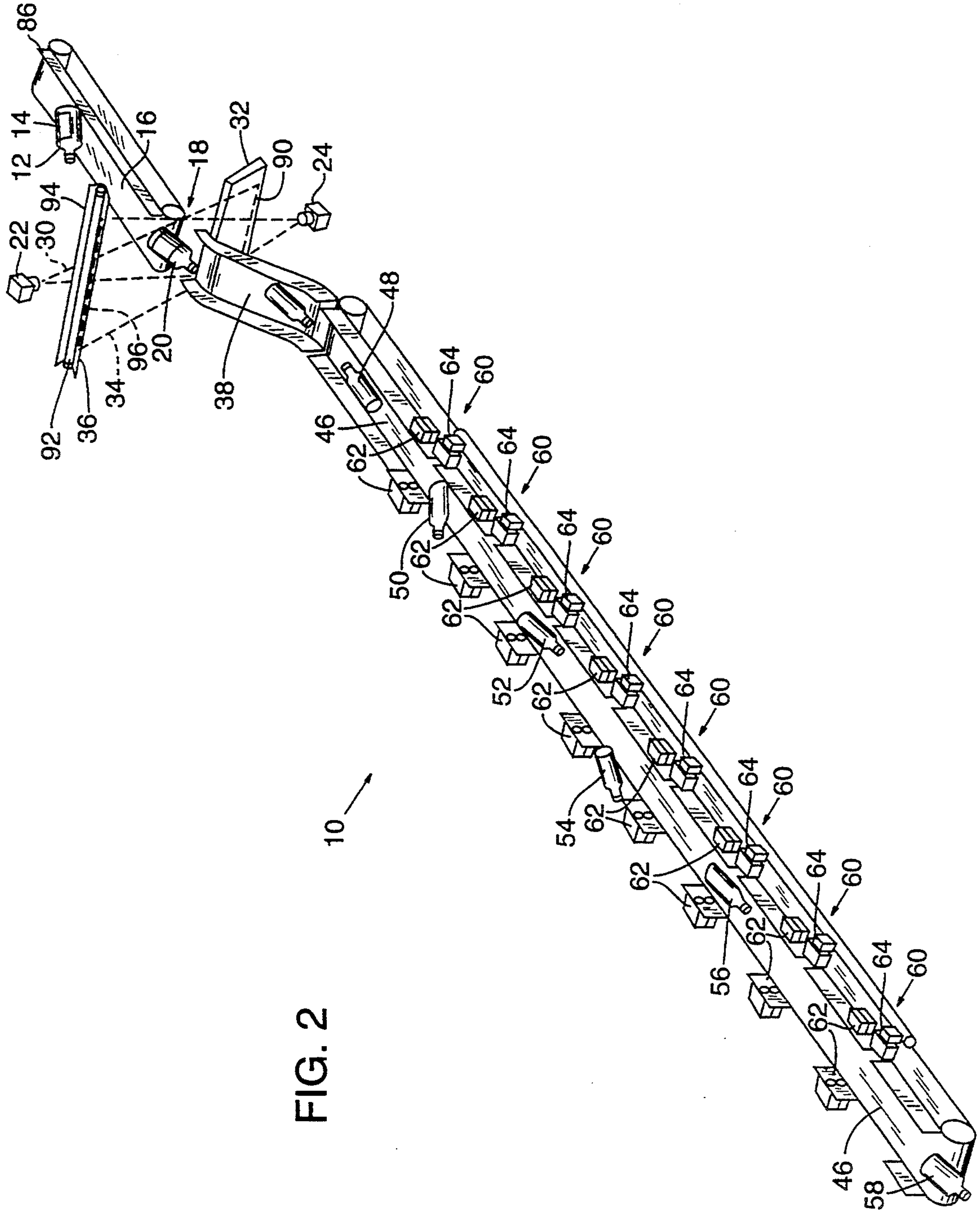
FIG. 2 is a simplified isometric pictorial view of a plastic container sorter according to this invention.

A general description of a plastic container sorter 10 according to this invention follows with reference to FIGS. 1 and 2. A plastic container 12, having a label 14, is placed on a presentation conveyor 16 for acceleration, stabilization, and propulsion through an inspection zone 18.

A plastic container 20, having a label 21, passes through inspection zone 18 where it is linearly scanned by a reflected light-sensing ("reflectance") camera 22 and a transmitted light-sensing ("transmittance") camera 24 for generation of respective reflectance and transmittance video images of plastic container 20 and label 21. Light from a pair of very-high-output ("VHO") fluorescent lamps 26 is focused on inspection zone 18 by associated parabolic reflectors 28. Reflectance camera 22 receives light reflected from plastic container 20 as it passes through a scanning plane 30. Reflectance camera 22 views plastic container 20 against a nonreflecting dark-cavity background 32. Transmittance camera 24 receives light transmitted through plastic container 20 as it passes through a scanning plane 34. The transmitted light originates from an illuminated background 36. Line scanning cameras 22 and 24 generate respective reflectance and transmittance video data streams while plastic container 20 passes through inspection zone 18. By the time plastic container 20 enters a transfer chute 38, sufficient video data have been generated to capture and process a reflectance image and a transmittance image of plastic container 20 in respective image processors 40 and 42.

Image processors 40 and 42 receive the reflectance and transmittance video as serial bit streams of amplitude modulated, repeating cycles of, red ("R"), green ("G"), and blue ("B") bits. The reflectance and transmittance RGB bit streams are each digitized, amplitude normalized, sorted into RGB color components, and built into RGB and binarized images for transparency and color analysis by a general purpose processor 44.

General purpose processor 44 receives RGB reflectance image data and binary reflectance image data from reflectance image processor 40 and receives RGB transmittance image data and binary transmittance image data from transmittance image processor 42. A container sorting program processes the transmittance data to determine whether container 20 is opaque. If container 20 is opaque, the sorting program processes the reflectance data to determine the container color. Color contamination from label 21 is avoided by the sorting program. If container 20 is not opaque, the transmittance data are further processed to determine whether container 20 is green transparent, translucent, or clear transparent. General purpose processor 44 associates the proper sorting classification with container 20 and enters these data into a container sorting queue.

An ejection conveyor 46 transports previously analyzed containers 48, 50, 52, 54, 56, and 58 through a series of ejection stations 60 each having a pair of photoelectric container sensors 62 and associated air ejectors 64. When a particular photoelectric container sensor 62 senses a container, an associated bit is set in a container sensor register 66. Likewise, a particular air ejector 64 is actuated in response to an associated bit being set in a container ejector register 68. Container sensor register 66 and container ejector register 68 are electrically connected to general purpose processor 44. The container sorting queue is flushed in response to signals from container sensor register 66 such that appropriate ones of air ejectors 64 are actuated at the correct times to eject previously analyzed containers from ejection stations 60 into appropriate collection bins 70.

Figure 3:
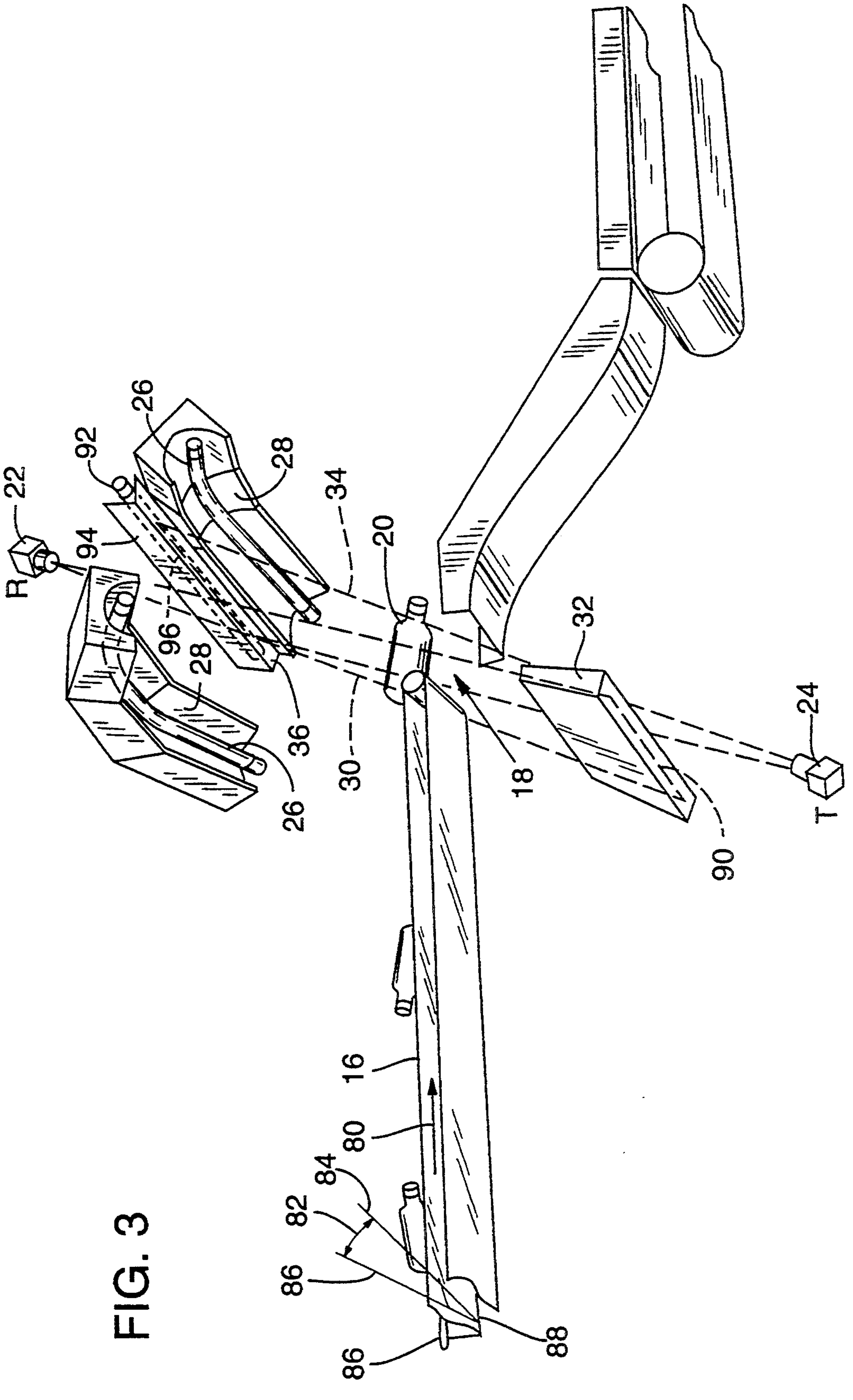
FIG. 3 is a fragmentary simplified isometric pictorial view of a container being inspected in an inspection zone of the plastic container sorter according to this invention.

The foregoing general description of plastic container sorter 10 proceeds in more detail with reference to FIG. 3.

Presentation conveyor 16 moves in a direction indicated by an arrow 80 at a fixed rate ranging from 30 to 213 meters per minute, with the preferred rate being 152 meters per minute. Presentation conveyor 16 is preferably 30.5 centimeters wide and has a surface tilt angle 82 in a range of from 5 to 20 degrees, with the preferred angle being 7.5 degrees. Surface tilt angle 82 is defined as the angle formed between an imaginary horizontal line 84 and an imaginary line 86 intersecting the planar surface of presentation conveyor 16 in a direction transverse to arrow 80. A slick side barrier 86, preferably TEFLON®, is mounted adjacent to an elevationally lower side margin 88 of presentation conveyor 16. Slick side barrier 86 provides orientation stability for round containers placed on presentation conveyor 16. The angular orientation of plastic container 20 in inspection zone 18 is not important, but its orientation change is limited to no more than 0.5 degree in any axis per centimeter of travel through inspection zone 18.

Reflectance camera 22 and transmittance camera 24 each are of a linear CCD array scanning type such as model TL-2600 manufactured by PULNIX America, Inc., Sunnyvale, California. Cameras 22 and 24 each have a single linear array of 2592 CCD elements incorporating repeating groups of alternating R, G, and B light wavelength filters. Each group of three CCD elements with respective R, G, and B filters is referred to as a triad. Cameras 22 and 24 have 864 triads in the 2592 element array and provide a cost-effective solution for many full color visible spectrum imaging applications.

Unfortunately, triad-based color cameras have an "edge effect" problem that causes color shifts at the edges of images scanned by such a camera. The edge effect is caused whenever the CCD array receives a light wavelength transition, such as that from a container edge. If the light wavelength transition is optically imaged on only a portion of a triad, then only those RGB elements that are imaged will generate a signal. For example, if a transition from black to red is imaged on only the G and B elements of a triad, no red signal will be generated. If a transition from white to black is imaged on only the R element of a triad, only a red signal will be generated. Clearly, accurate color signal generation depends on edges being imaged on all elements of a triad.

Plastic container sorter 10 reduces edge effects by using data from only every fourth triad and defocusing the camera to enlarge the effective pixel diameter by 10 times. This increases image overlap within each triad to greater than 95 percent but does not degrade effective image focus, because the triads used are spaced apart by 12 pixels.

The effective resolution of cameras 22 and 24 is such that each triad receives light from a 0.4 by 0.4 square centimeter area in viewing zone 18. In each camera, image data from the center-most 75 actually used triads are used to store an image of viewing zone 18. Data from other triads are ignored. Therefore, the portion of viewing zone 18 intersected by scanning planes 30 and 34 measures 0.4 by 30.5 centimeters. Up to one hundred successive scans are used to scan adjacent 0.4 centimeter sections of plastic container 20 as it passes through viewing zone 18. Sufficient image data are collected to store a 75 by up to 100 triad image of an object, such as plastic container 20, passing through viewing zone 18. The effective image size is, therefore, 30.5 by up to 40.5 centimeters.

Another problem with triad-based color cameras is that certain CCD array chips have differing signal output values between odd- and even-numbered elements. For example, every other triad may have high-red, low-green and high-blue values, whereas the other (interleaved) triad may have low-red, high-green and low blue values. Alternating color distortion results if all triads are used to generate an image. Because plastic container sorter 10 uses triads spaced apart by three unused triads, alternating color distortion is eliminated. Any odd-numbered triad spacing would also eliminate alternating color distortion.

Cameras 22 and 24 are each fitted with a NIKON 50 millimeter f:1.4 lens set to an f2.8 aperture value. Exposure time for each camera scan is 1.5 milliseconds. Focal plane to viewing zone 18 distance is preferably 130 centimeters. Suitable lenses are available from NIKON OEM Sales, Diamond Bar, Calif.

Viewing zone 18 requires about 550 foot-lamberts of illumination for reflectance camera 22 to properly expose its CCD array under the foregoing exposure conditions. Sufficient illumination is provided by using a pair of parabolic reflectors 28 to focus light propagating from associated VHO fluorescent lamps 26 on viewing zone 18. Each of VHO lamps 26 is a 122 centimeter long, VHO daylight fluorescent bulb driven by an optically regulated power supply such as model FXC-16144-2 manufactured by Mercron, Inc., Richardson, Texas. Each of VHO lamps 26 is bent into three linear sections including a center linear section and two end linear sections, each 41 centimeters long. The lamps are bent by techniques well known in the neon sign industry. Each of the end sections is bent about 25 degrees relative to the longitudinal axis of the center section and such that the longitudinal axes of all sections are co-planar.

Each of parabolic reflectors 28 is fabricated by joining a center linear parabolic section and two end linear parabolic sections at an angle matching that of VHO lamps 26. VHO lamps 26 are positioned within parabolic reflectors 28 such that their respective longitudinal axes and lines of focus coincide.

A preferred distance of about one meter between VHO lamps 26 and viewing zone 18 provides uniform illumination of an adequately large scanning area to accommodate a large range of container sizes.

Dark-cavity background 32 is a 92 centimeter long by 31 centimeter high box that tapers in width from 8 centimeters at its base to 4 centimeters at its open top. All interior surfaces are a flat black color to provide a reflectance of less than 2 percent to visible light having wavelengths ranging from 400 to 700 nanometers. The remaining reflectance is lambertion in nature. Dark-cavity background 32 is preferably positioned 92 centimeters beneath viewing zone 18 and is aligned to enclose a terminal portion 90 of reflectance scanning plane 30.

Light propagating from illuminated background 36 is transmitted through container 20 in viewing zone 18 to transmittance camera 24. Illuminated background 36 is preferably an 8 centimeter wide by 122 centimeter long white light-diffusing panel that is illuminated by a 122 centimeter long VHO daylight fluorescent lamp 92 driven to approximately 80 percent of maximum brightness by an optically regulated power supply such as Mercron Ballast Model HR 2048-2. A glare shield 94 prevents stray light from VHO lamp 92 from entering reflectance camera 22. Illuminated background 36 is preferably positioned at least one meter above viewing zone 18 and is aligned such that its long axis coincides with a terminal portion 96 of transmittance scanning plane 34. Such a positioning accommodates the passage of oversized containers through viewing zone 18 and minimizes the possibility of stray light from VHO lamps 26 being reflected off bright container surfaces, to illuminated background 36, and into transmittance camera 24.

Objects in viewing zone 18, such as container 20, are readily classified as opaque, translucent, or transparent when scanned by transmittance camera 24 against illuminated background 36. Opaque objects, including label 21, are easily classified by comparing the light intensities received by transmittance camera 24 from illuminated background 36 and the object in viewing zone 18. An object that transmits no more than about ten percent of the light received from illuminated background 36 is indicative of an opaque object. An object that transmits between about ten and 30 percent of the light received from illuminated background 36 is indicative of a translucent object. Classification of objects is described below in more detail with reference to FIGS. 5 and 6.

Figure 4:
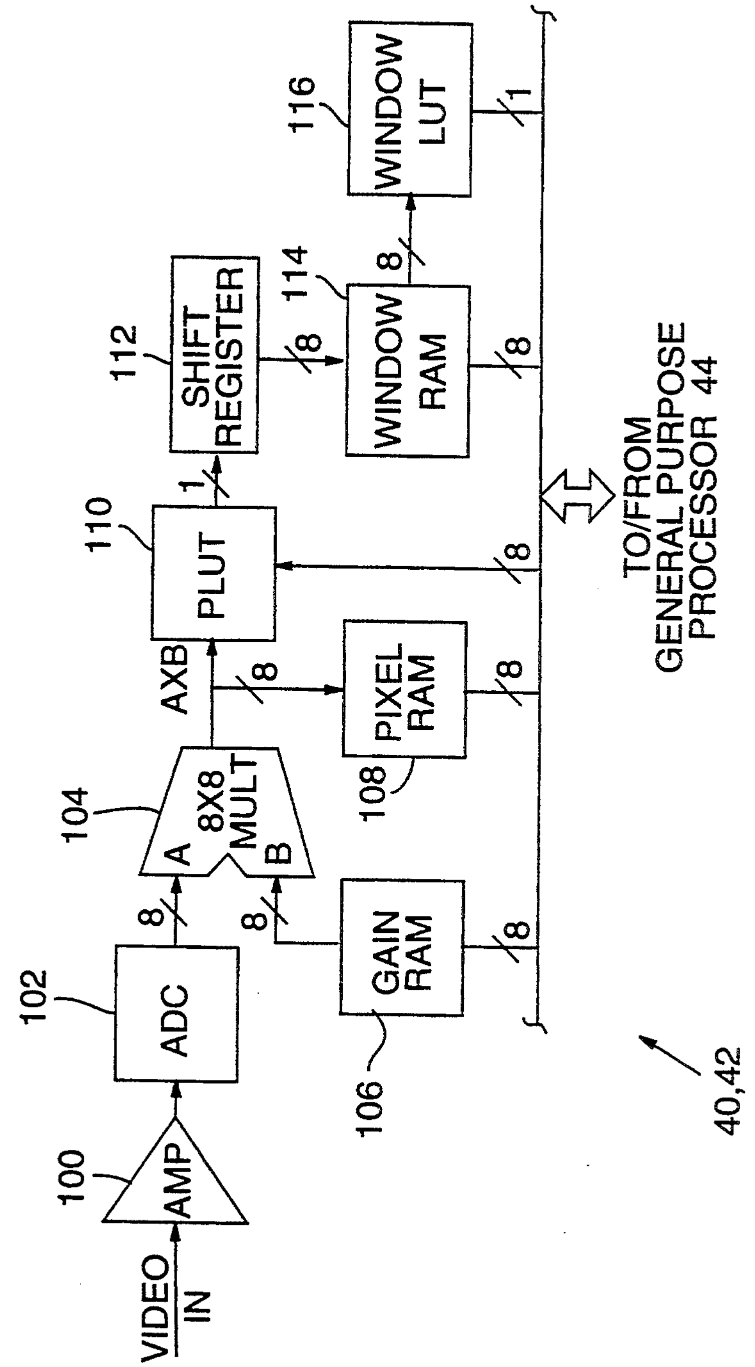
FIG. 4 is a simplified schematic block diagram showing an image processor according to this invention.

Cameras 22 and 24 generate respective reflectance and transmittance video data streams that are each digitized, normalized, and binarized by respective reflectance and transmittance image processors 40 and 42. Image processors 40 and 42 function as described hereafter with reference to FIG. 4. Only the processing of transmittance video data by transmittance image processor 42 will be described because image processors 40 and 42 are substantially identical.

Transmittance video data enters transmittance image processor 42, is conditioned by a video amplifier 100, and digitized to eight bits by an analog-to-digital converter ("ADC") 102. The digitized transmittance video data are a sequential stream of alternating red, green, and blue raw eight-bit data values that enter an 8×8 digital multiplier 104 at a set A of input terminals for normalization. Normalization is a well-known process by which sensitivity differences associated with each CCD element in camera 24 are equalized.

However, normalization first requires that a calibration process be carried out without any objects in viewing zone 18. Calibration entails comparing a raw data value associated with each CCD element in camera 24 with a standard data value, calculating a difference value for each CCD element, and storing in a memory a compensating multiplication factor for each CCD element.

During subsequent operation, each raw data value is multiplied by its associated multiplication factor to provide a normalized data value.

Image processor 42 starts the calibration process by receiving from general purpose processor 44 a command that initializes all storage locations in a gain RAM to a unity value. The 8×8 digital multiplier 104 receives the values stored in gain RAM 106 at a set B of input terminals. A scan by transmittance camera 24 of inspection zone 18 generates a stream of sequential raw video data values that are digitized by ADC 102, unity multiplied by digital multiplier 104, and stored in a set of sequential data locations in a pixel RAM 108. The raw video data values stored in pixel RAM 108 are read by general purpose processor 44 and compared with a preferred standard data value of 220 (decimal equivalent of stored binary value). General purpose processor 44 calculates the difference between the raw data values and the standard data value and calculates a multiplication factor for each raw data value. General purpose processor 44 completes the calibration process by storing the calculated multiplication factors in gain RAM 106 at locations associated with each raw data value.

Normalization subsequently proceeds when digital multiplier 104 receives on set A of input terminals a sequence of raw data values. As each sequential raw data value is received, the multiplication factor associated with each data value is received from gain RAM 106 at set B of input terminals of digital multiplier 104. Digital multiplier 104 generates, at a set A×B of output terminals, normalized data values that are stored in pixel RAM 108 and which are used to address locations in a pixel lookup table ("PLUT") 110.

The normalized eight-bit data values stored in pixel RAM 108 are read by general purpose processor 44, assembled into 24-bit RGB triad data values, and stored by general purpose processor 44 as transmittance RGB image data.

Binarization of the normalized eight-bit data values provides for differentiating container data from background data. Binarization of transmittance data entails programming a logic-0 state into PLUT 110 of transmittance image processor 42 at all storage locations having addresses ranging from 210 to 230 and a logic-1 state into storage locations having addresses 0 through 209 and 231 through 255. Accordingly, all normalized eight-bit data values presented to PLUT 110 that are within 10 units of 220 are background data values, and the others are object data values.

In similar manner, binarization of reflectance data entails programming a logic-0 state into PLUT 110 of reflectance image processor 40 at all storage locations having addresses ranging from 0 to 10 and a logic-1 state into storage locations having addresses 11 through 255.

PLUT 110 generates a logic-0 bit in response to each background data value and a logic-1 bit in response to each object data value. Each normalized data value generates a corresponding bit that is shifted into an eight-bit shift register 112 that functions as a serial-to-parallel converter. For each bit shifted into eight-bit shift register 112, a corresponding eight-bit parallel data byte is formed that is stored in a window RAM 114.

As was stated earlier, RGB data triads are formed from groupings of three sequential data values. Therefore, if any bit, in a group of three sequential bits, that is generated by PLUT 110 is a logic-1, the associated triad is an object triad. If all three sequential bits generated by PLUT 100 are logic-0, the triad is a background triad. This determination is made by a window lookup table ("window LUT") 116 that is programmed to logically OR the first three bits of each data byte formed by eight-bit shift register 112 as each byte is stored in window RAM 114. Accordingly, if the output of window LUT 116 is a logic-1, the most recent three bytes represent an object triad. Otherwise, if the output of window LUT 116 is a logic-0, the most recent three bytes represent a background triad. The binarized data generated by window LUT 116 is routed by general purpose processor 44 to a memory.

By way of example, Table 1 shows representative data undergoing the foregoing signal processing steps. Container edge transmittance image data from transmittance camera 24 CCD elements 1187 through 1250 are shown making a transition from a semi-transparent green value to a background value. Bold highlighted data rows indicate every fourth RGB triad that is processed by general purpose processor 44. Of the 75 triads used, data from triads numbered 28 through 33 are shown. Unused triads are so indicated. Column three shows the normalized data values associated with each CCD element. The normalized data values are processed by PLUT 110 and stored in pixel RAM 108. Column four shows the data bit states generated by PLUT 110.

The data in Table 1 are ordered with the most recent data shown at the bottom, i.e., CCD element number 1187 is processed first and CCD element number 1250 is processed last. Column five shows the data bytes formed in shift register 112 in response to each bit received from PLUT 110. The data bytes are shown eight bits delayed relative to the data bits received from PLUT 110 as shown in column four. The right-most three underlined data bits are those logically ORed by window LUT 116 to make a data binarization decision. Column six shows the output of window LUT 116 with indicating the data bits processed by general purpose processor 44 to store a binarized transmittance image. Note that the data bit is used because the underlined bits in shift register 112 contain data associated with the current RGB triad.

TABLE 1

| CCD Element No. | RGB Triad No. | Pixel RAM Normalized Data Value | Pixel LUT Output | Shift Register Contents | Window LUT Output |
|---|---|---|---|---|---|
| 1187 | 28(B) | 220 | 0 | 00000000 | {0} |
| 1188 | 28(R) | 221 | 0 | 00000000 | 0 |
| 1189 | 28(G) | 218 | 0 | 00000000 | 0 |
| 1190 | unused(B) | 216 | 0 | 00000000 | 0 |
| 1191 | unused(R) | 219 | 0 | 00000000 | 0 |
| 1192 | unused(G) | 220 | 0 | 00000000 | 0 |
| 1193 | unused(B) | 217 | 0 | 00000000 | 0 |
| 1194 | unused(R) | 217 | 0 | 00000000 | 0 |
| 1195 | unused(G) | 219 | 0 | 10000000 | 0 |
| 1196 | unused(B) | 215 | 0 | 11000000 | 0 |
| 1197 | unused(R) | 217 | 0 | 01100000 | 0 |
| 1198 | unused(G) | 221 | 0 | 11011000 | 0 |
| 1199 | 29(B) | 214 | 0 | 11011000 | {0} |
| 1200 | 29(R) | 215 | 0 | 01101100 | 1 |
| 1201 | 29(G) | 219 | 0 | 10110110 | 1 |
| 1202 | unused(B) | 209 | 1 | 11011011 | 1 |
| 1203 | unused(R) | 207 | 1 | 01101101 | 1 |
| 1204 | unused(G) | 217 | 0 | 10110110 | 1 |
| 1205 | unused(B) | 202 | 1 | 11011011 | 1 |
| 1206 | unused(R) | 201 | 1 | 01101101 | 1 |
| 1207 | unused(G) | 215 | 0 | 10110110 | 1 |
| 1208 | unused(B) | 197 | 1 | 11011011 | 1 |
| 1209 | unused(R) | 194 | 1 | 11101101 | 1 |
| 1210 | unused(G) | 214 | 0 | 11110110 | 1 |
| 1211 | 30(B) | 190 | 1 | 11111011 | {1} |
| 1212 | 30(R) | 185 | 1 | 11111101 | 1 |
| 1213 | 30(G) | 211 | 0 | 11111110 | 1 |
| 1214 | unused(B) | 182 | 1 | 11111111 | 1 |
| 1215 | unused(R) | 165 | 1 | 11111111 | 1 |
| 1216 | unused(G) | 204 | 1 | 11111111 | 1 |
| 1217 | unused(B) | 157 | 1 | 11111111 | 1 |
| 1218 | unused(R) | 147 | 1 | 11111111 | 1 |
| 1219 | unused(G) | 199 | 1 | 11111111 | 1 |
| 1220 | unused(B) | 143 | 1 | 11111111 | 1 |
| 1221 | unused(R) | 136 | 1 | 11111111 | 1 |
| 1222 | unused(G) | 193 | 1 | 11111111 | 1 |

TABLE 1-continued

| CCD Element No. | RGB Triad No. | Pixel RAM Normalized Data Value | Pixel LUT Output | Shift Register Contents | Window LUT Output |
|---|---|---|---|---|---|
| 1223 | 31(B) | 132 | 1 | 11111111 | {1} |
| 1224 | 31(R) | 110 | 1 | 11111111 | 1 |
| 1225 | 31(G) | 188 | 1 | 11111111 | 1 |
| 1226 | unused(B) | 128 | 1 | 11111111 | 1 |
| 1227 | unused(R) | 108 | 1 | 11111111 | 1 |
| 1228 | unused(G) | 184 | 1 | 11111111 | 1 |
| 1229 | unused(B) | 121 | 1 | 11111111 | 1 |
| 1230 | unused(R) | 105 | 1 | 11111111 | 1 |
| 1231 | unused(G) | 177 | 1 | 11111111 | 1 |
| 1232 | unused(B) | 117 | 1 | 11111111 | 1 |
| 1233 | unused(R) | 099 | 1 | 11111111 | 1 |
| 1234 | unused(G) | 173 | 1 | 11111111 | 1 |
| 1235 | 32(B) | 111 | 1 | 11111111 | {1} |
| 1236 | 32(R) | 097 | 1 | 11111111 | 1 |
| 1237 | 32(G) | 167 | 1 | 11111111 | 1 |
| 1238 | unused(B) | 113 | 1 | 11111111 | 1 |
| 1239 | unused(R) | 096 | 1 | 11111111 | 1 |
| 1240 | unused(G) | 169 | 1 | 11111111 | 1 |
| 1241 | unused(B) | 112 | 1 | 11111111 | 1 |
| 1242 | unused(R) | 095 | 1 | 11111111 | 1 |
| 1243 | unused(G) | 172 | 1 | 11111111 | 1 |
| 1244 | unused(B) | 110 | 1 | 11111111 | 1 |
| 1245 | unused(R) | 097 | 1 | 11111111 | 1 |
| 1246 | unused(G) | 168 | 1 | 11111111 | 1 |
| 1247 | 33(B) | 112 | 1 | 11111111 | {1} |
| 1248 | 33(R) | 096 | 1 | 11111111 | 1 |
| 1249 | 33(G) | 170 | 1 | 11111111 | 1 |
| 1250 | unused(B) | 111 | 1 | 11111111 | 1 |

Figure 5:
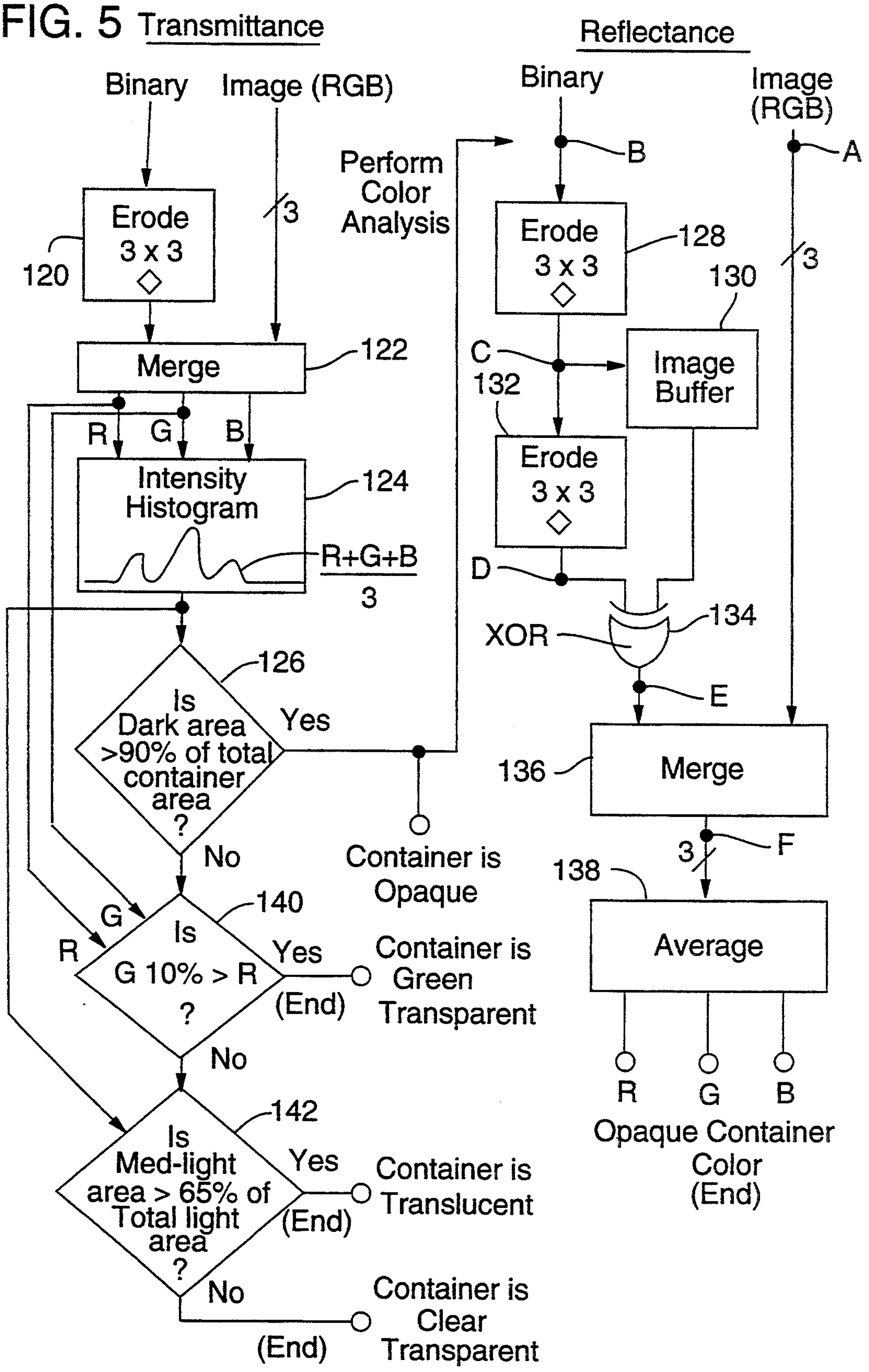
FIG. 5 is a flow chart showing the processing steps executed to sort plastic containers according to this invention.
Figure 6A:
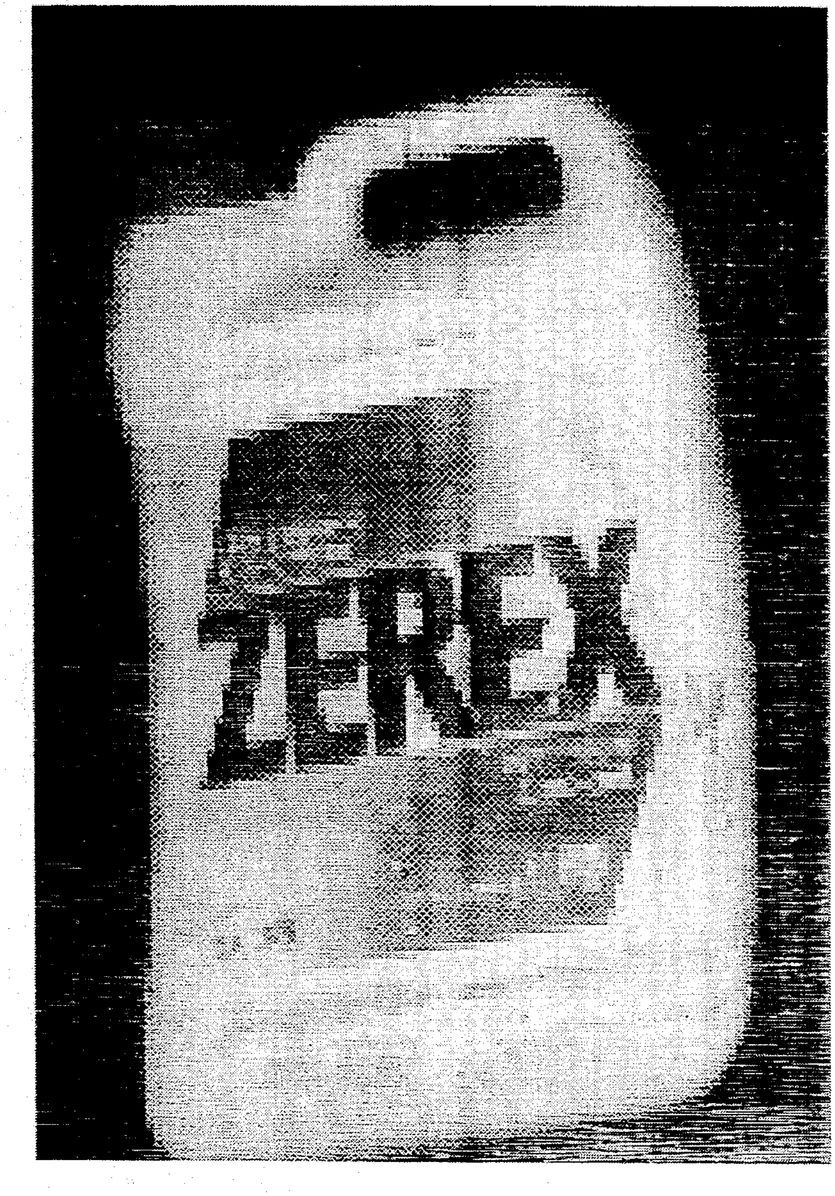
FIGS. 6A–6F are pictorial representations of plastic container digital image data taken at various points in the processing steps indicated in FIG. 5.
Figure 6B:
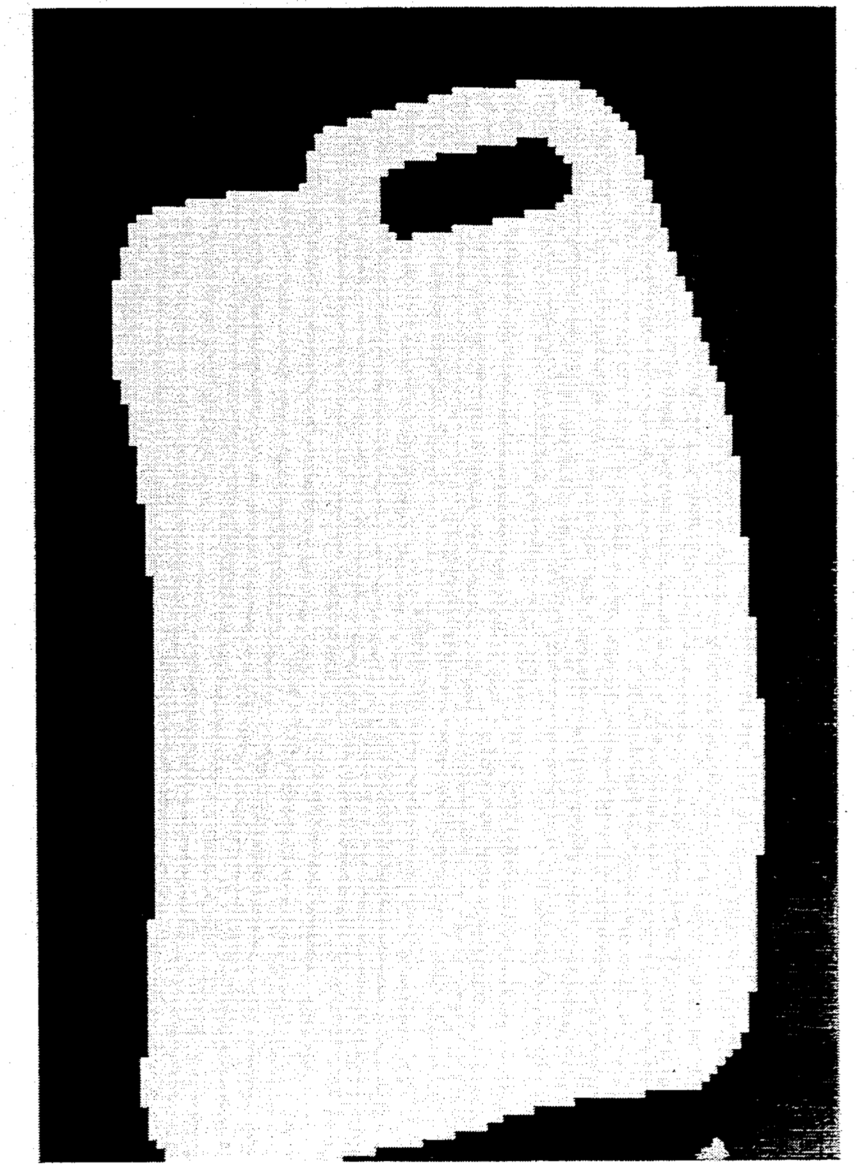
Figure 6C:
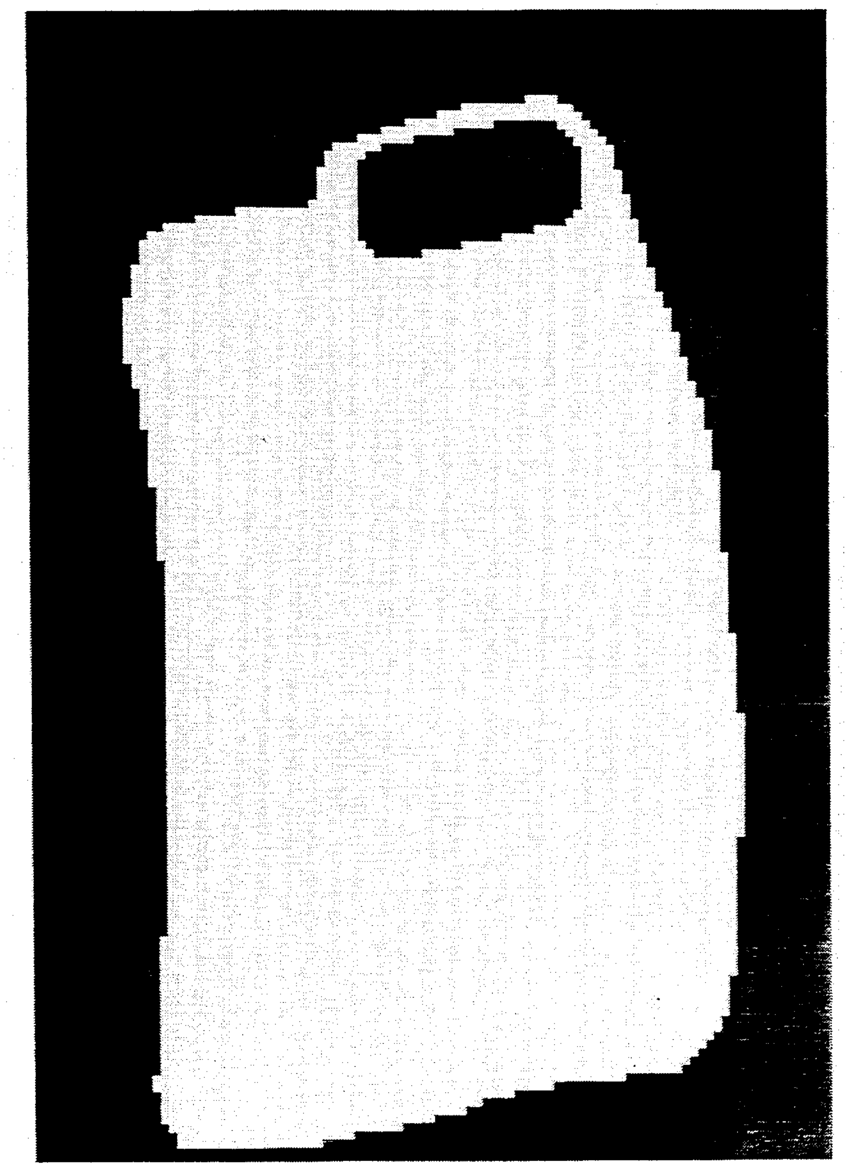
Figure 6D:
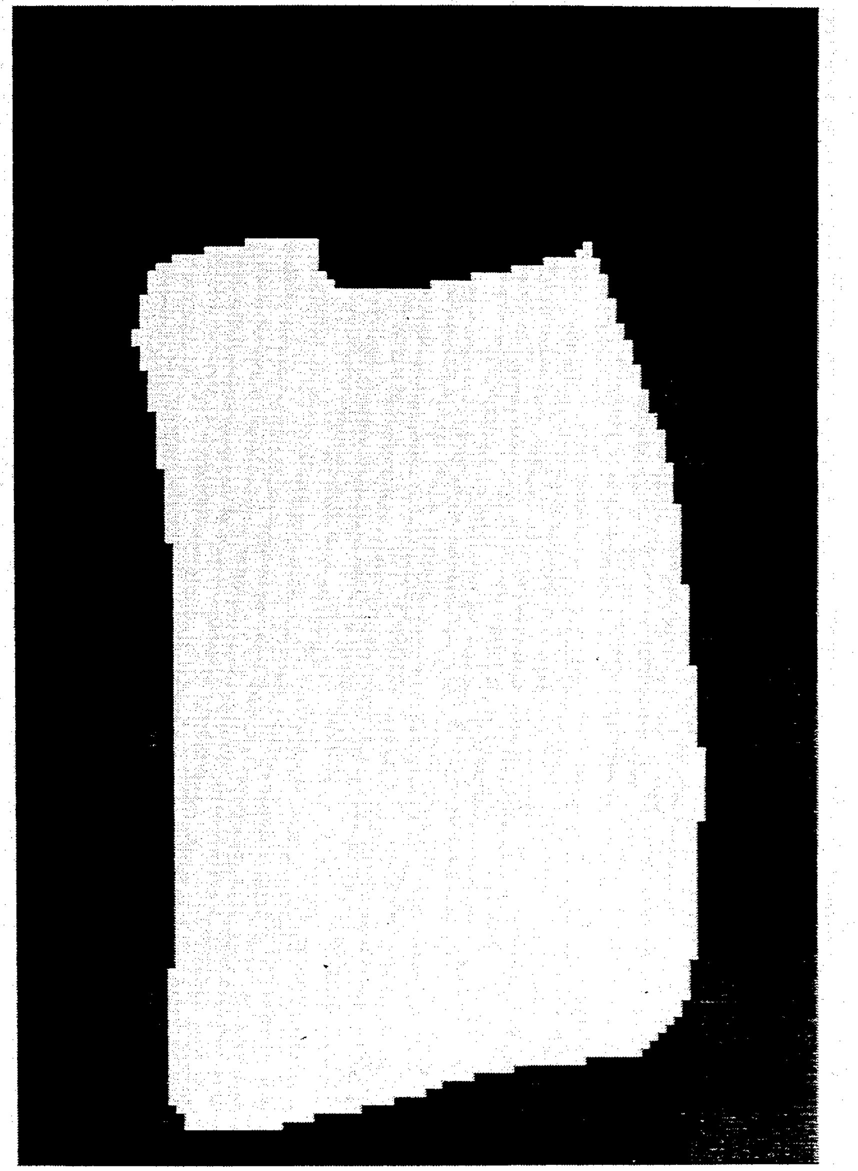
Figure 6E:
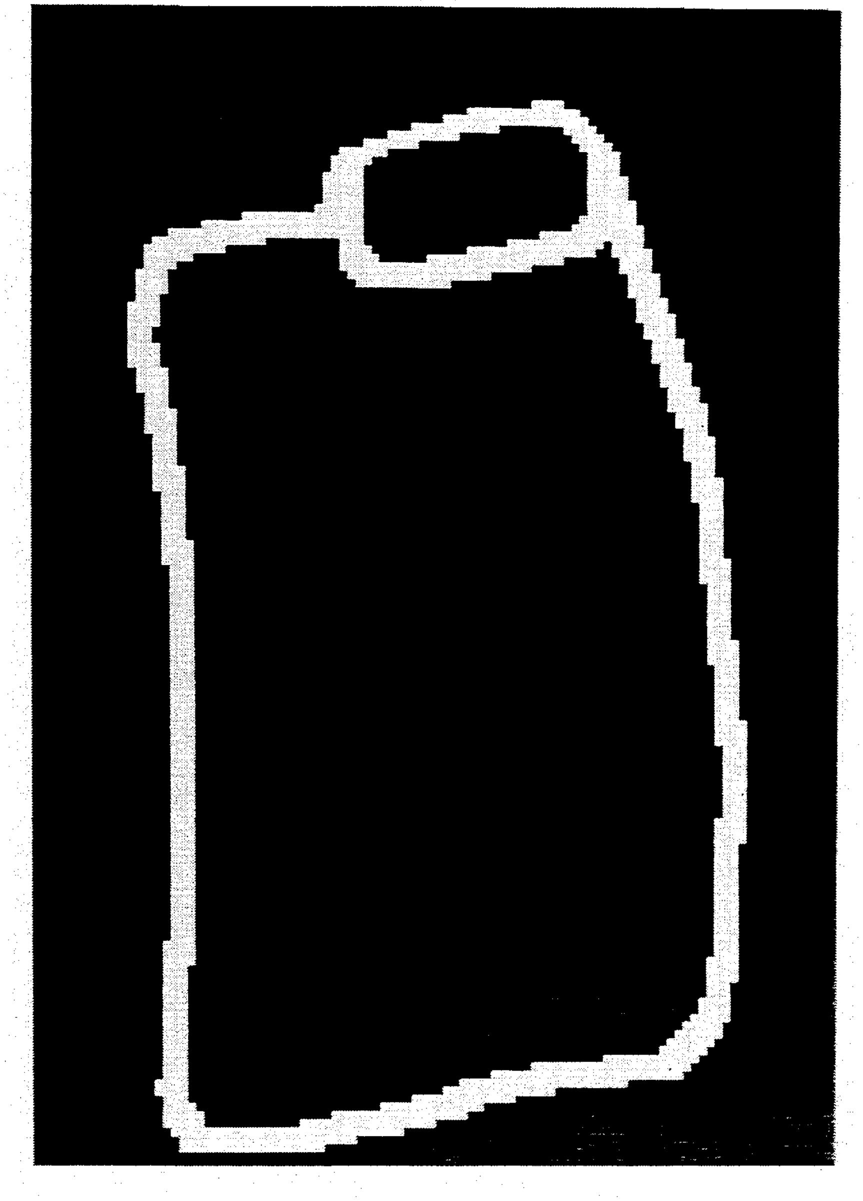
Figure 6F:
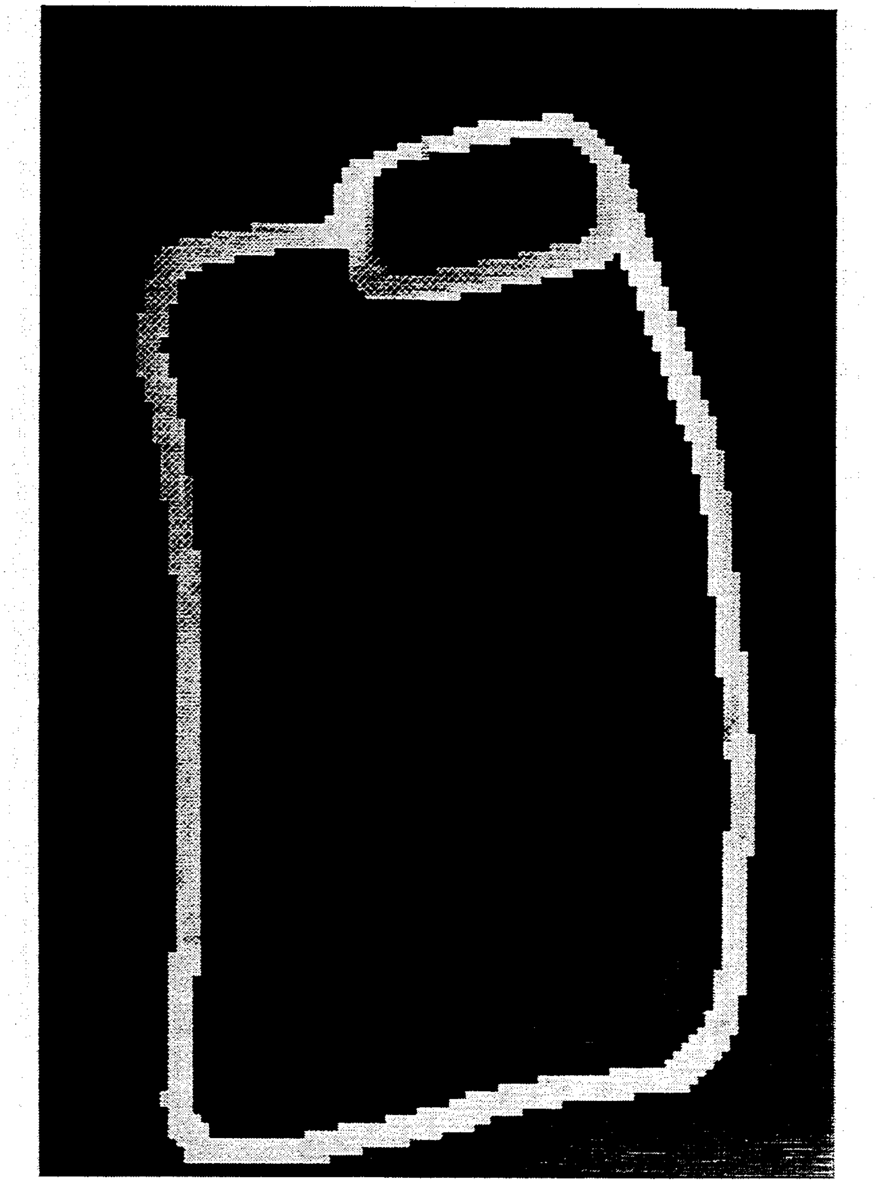

General purpose processor 44 receives normalized and binarized image data from transmittance image processor 42 and reflectance image processor 40. FIG. 5 shows the processing steps executed by general purpose processor 44 to classify objects such as container 20 into transparency and color categories. The ensuing steps are preferably executed as a C-language program by a conventional 50 MegaHertz 486 microprocessor. Such a processor and program combination is capable of processing containers propelled through inspection zone 18 at the preferred 152 meter per minute rate. Skilled workers knowing the following processing steps can readily provide an appropriate program.

An erosion process 120 receives the binarized image data from transmittance image processor 42 for erosion by a diamond-shaped structuring element fitting within a three-by-three square area of data. Erosion is a process by which data bits not overlaying a predetermined structuring shape are erased. Erosion removes "noisy" and edge image data to further reduce edge effects.

A data merging process 122 receives from erosion process 120 the eroded binarized image data and combines them with the normalized RGB transmittance image data from transmittance image processor 42 to generate eroded and normalized RGB transmittance image data with the background data removed. In other words, merging process 122 filters out all data except for nonedge container data.

A histogram process 124 accumulates the quantity of each unique intensity value ((R+G+B)/3) received from merging process 122 to build a light intensity histogram curve for light transmitted through container 20.

A decision process 126 determines whether the "dark area" under the histogram curve exceeds a user-determined percentage, preferably 90 percent, of the total container area.

If decision process 126 yields a "yes" answer, container 20 is opaque and the following color analysis process is executed.

FIGS. 6A through 6F are representative processed images of container 20 shown at respective points A through F of the ensuing color analysis process.

An erosion process 128 receives the binarized image data (point B) from reflectance image processor 40 for erosion by a diamond-shaped structuring element fitting within a three-by-three square area of data.

A temporary image buffer 130 saves the eroded image (point C).

An erosion process 132 receives the once-eroded binarized image data (point C) from erosion process 128 and erodes it a second time with a diamond-shaped structuring element fitting within a three-by-three square area of data (point D).

A logical process 134 exclusively-ORs the doubly eroded image (point D) and the saved once-eroded image (point C) to generate "binary trace ring" image data (point E).

A data merging process 136 receives the binary trace ring image data from logical process 134 (point E) and combines it with the normalized RGB reflectance image data from reflectance image processor 40 (point A). Data merging process 136 generates an RGB color trace ring including normalized RGB reflectance image data with the background, edge, and center data (including most label data) removed (point F).

An averaging process 138 determines the average R, G, and B color data values in the color trace ring.

The process is ended. Container 20 is opaque and has the RGB color determined by averaging process 138.

If, however, decision process 126 yields a "no" answer, container 20 is not opaque and the following process is executed.

A decision process 140 receives R and G data from data merging process 122 and determines whether the green data values are at least a user determined percentage, preferably ten percent, greater than the red data values. If decision process 140 yields a "yes" answer, container 20 is green transparent and the process is ended.

If, however, decision process 140 yields a "no" answer, container 20 is not opaque or green transparent, and a decision process 142 analyzes the histogram data generated by histogram process 124. Decision process 142 compares the "light" histogram area to the "medium-light" histogram area to decide if container 20 is translucent or transparent. The light area of the histogram curve is slightly below a "bright background" value, whereas the medium-light area is much farther below the bright background value. If the medium-light area is at least a user determined percentage, preferably 65 percent, of the total light area, decision process 142 yields a "yes" answer, indicates that container 20 is translucent, and ends the process.

Otherwise, decision process 142 yields a "no" answer, indicates that container 20 is clear transparent, and ends the process.

General purpose processor 44 associates the proper sorting classification with container 20 and enters these data into a container sorting queue. Sorting classification data associated with each scanned and analyzed container is added to the container sorting queue.

Figure 7:
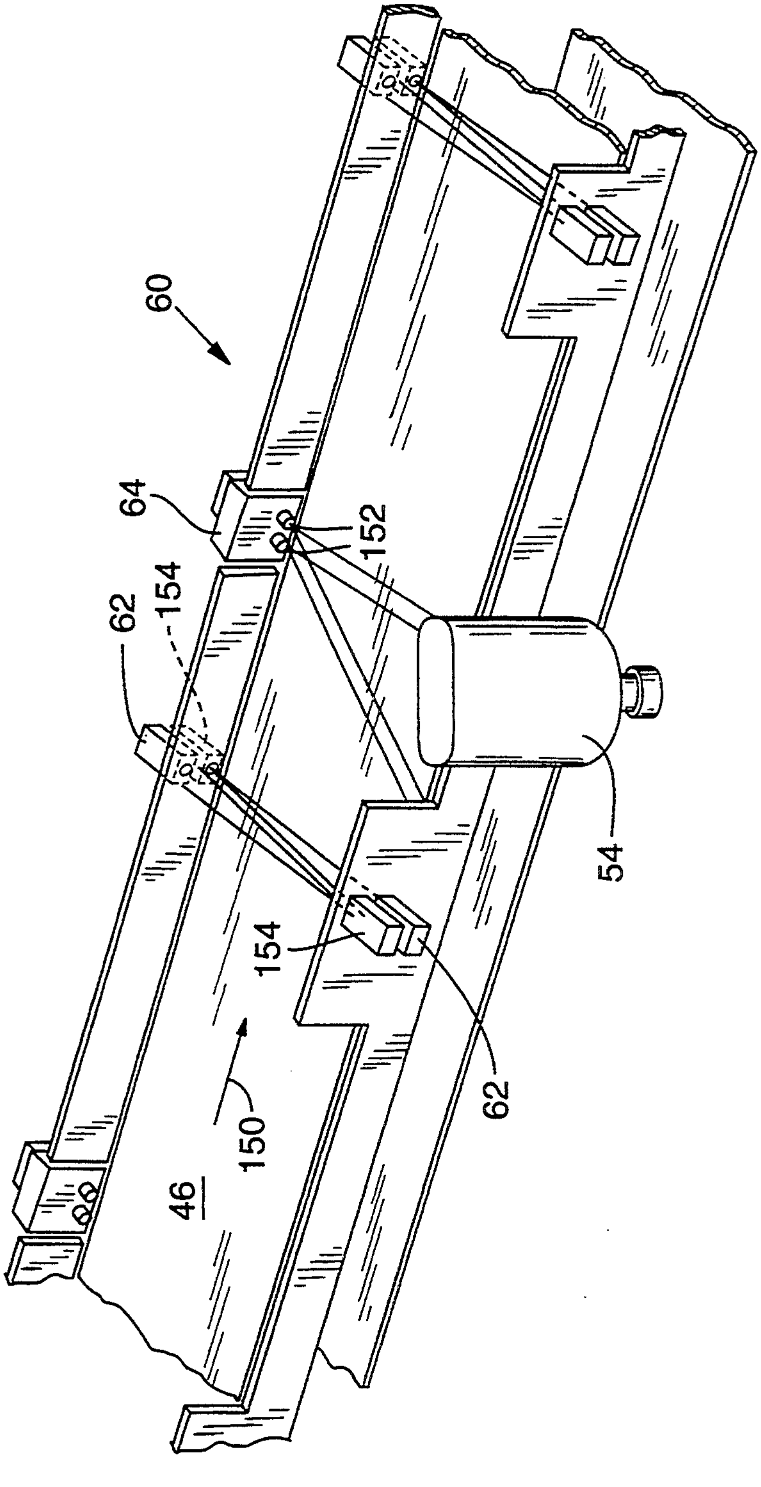
FIG. 7 is a fragmentary simplified isometric pictorial view of a container being ejected off an ejection conveyor according to this invention.

FIG. 7 shows an enlarged portion of ejection conveyor 46 in the region of ejection station 60, shown ejecting container 54 (FIG. 2). Ejection conveyor 46 is preferably 36 centimeters wide by 9.1 meters long, moves in a direction indicated by arrow 150 at a rate of 152 meters per minute, and has eight ejection stations 60.

Belt movement rate is used as a coarse container tracking parameter. Other container tracking parameters used by general purpose processor 44 include the distances along ejection conveyor 46 to each air ejector 64, a holdoff time for each air ejector, and an actuation duration time for each air ejector. Each air ejector 64 includes two separately controllable nozzles 152 that are aimed slightly upward to lift containers off ejection conveyor 46 during ejection.

Fine container tracking is necessary to account for unpredictable container rate of travel through inspection zone 18 and transfer chute 38 and because of possible shifting, floating, and rolling of containers on ejection conveyor 46. Fine container tracking is provided by pairs of oppositely facing photoelectric sensors 62 that are illuminated by complementary opposite pairs of light sources 154.

A container passing between a particular pair of photoelectric sensors 62 and light sources 154 is detected for a time related to its profile, transparency, and rate. General purpose processor 44 uses the container profile already captured in the binarized reflectance image data and actuates the next adjacent air ejector 64 at a time and for a duration sufficient to eject the container. Air blasts are preferably timed to strike a central portion of each container.

Coarse and fine container tracking is coordinated with the container sorting queue and tracking parameters by general processor 44. Preferred container sorting categories for ejection stations 60 include: translucent; clear transparent; green transparent; red, orange, or yellow opaque; blue or green opaque; dark opaque; and white opaque. Unidentifiable containers travel off the end of ejection conveyor 46.

Skilled workers will recognize that alternate embodiments exist for portions of this invention. For example, cameras other than line scanning types having sequential RGB CCD element triads may be used, as may light wavelengths other than RGB. Logic states may be inverted from those described, provided the equivalent logical function is performed. Image processing may entail other than the described structuring elements, and a three-dimensional lookup table could be substituted for window RAM 114 and window LUT 116. General purpose processor 44 could be one of many processor types, and the sorting program executed thereon could be written in a wide variety of programming languages including assembler. Alternatively, the sorting program could be implemented with discrete logic components. A histogram process or a color lookup table would be suitable substitutes for averaging process 138.

It will be obvious to those having skill in the art that many changes may be made to the details of the above-described embodiment of this invention without departing from the underlying principles thereof. Accordingly, it will be appreciated that this invention is also applicable to containers without labels affixed to them and to inspection and sorting applications other than those found in plastic container sorting. The scope of the present invention should be determined, therefore, only by the following claims.

We claim:

1. A plastic container sorting apparatus, comprising:

a presentation conveyor moving in a first direction and downwardly tilted in a second direction transverse to the first direction such that the plastic containers placed on the presentation conveyor tend to move in the second direction toward a stationary side barrier that stabilizes an orientation of the plastic containers as they are propelled by the presentation conveyor through an air space forming an inspection zone;

a first video camera receiving reflected light from the plastic containers in the inspection zone and generating a stream of reflectance image data;

a second video camera receiving light transmitted through the plastic containers in the inspection zone and generating a stream of transmittance image data; and a processor classifying translucent ones of the plastic containers into translucency categories in response to the transmittance image data and opaque ones of the plastic containers into color categories in response to the reflectance image data.

2. The apparatus of claim 1 further comprising an ejection conveyor that receives the plastic containers from the inspection zone and ejects the classified plastic containers from predetermined locations of the ejection conveyor, each of the predetermined locations being associated with one or more of the translucency and color categories.

3. The apparatus of claim 1 in which the first video camera has a reflectance scanning plane that terminates in a dark cavity background.

4. The apparatus of claim 1 further comprising:

an illumination light source illuminating the plastic containers in the inspection zone, the illumination light source being the source of the reflected light received by the first video camera;

a background light source producing background light in the inspection zone, the background light source being the source of transmitted light received by the second video camera; and a reflectance image data processor and a transmittance image data processor normalizing and binarizing the respective streams of reflectance and transmittance image data.

5. The apparatus of claim 4 in which the illumination light source comprises a fluorescent lamp bent in multiple linear coplanar segments and positioned in a focal axis of a parabolic reflector.

6. The apparatus of claim 1 in which the tilt of the presentation conveyor ranges from about 5 degrees to about 20 degrees relative to a horizontal line.

7. The apparatus of claim 1 in which the side barrier has a slick surface.

8. The apparatus of claim 1 in which the first and second video cameras are of a linear charge-coupled device array, line-scanning type each camera having a single linear array of charge-coupled device elements in which adjacent triads of charge-coupled device elements are sensitive to red, green, and blue wavelengths of light, and in which the processor employs nonadjacent ones of the triads to eliminate a color distortion in the respective streams of reflectance and transmittance image data.

9. The apparatus of claim 1 in which the stream of reflectance image data includes label data and edge data, and in which the processor twice erodes selected portions of the reflectance image data to generate color trace ring data that exclude the edge data and most of the label data.

10. In a plastic container sorter a method of acquiring and processing image data, comprising the steps of:

receiving transmittance and reflectance image data representative of the plastic container;

processing the transmittance data to determine whether the plastic container is one of substantially transparent, substantially translucent, and substantially opaque;

processing the reflectance data if the plastic container is substantially opaque to determine a reflected color of the plastic container; and processing the transmittance data further if the plastic container is one of substantially transparent and substantially translucent to determine whether the plastic container is a substantially green transmitted color.

11. The method of claim 10 in which the plastic container is one of substantially transparent and substantially translucent, and is not a substantially green transmitted color, further comprising the step of analyzing the processed transmittance data to determine whether the plastic container is one of translucent and a clear color.

12. The method of claim 11 further comprising the step of classifying the plastic container into a sorting category based on at least one of an opacity value, a translucency value, a transmitted color, and a reflected color of the plastic container.

13. The method of claim 10 in which the transmittance data processing step includes the steps of:

normalizing, binarizing, and eroding the transmittance data;

merging the normalized, binarized, and eroded transmittance data with the transmittance data to provide merged transmittance data; and analyzing the merged transmittance data to determine a degree of opacity for the plastic container.

14. The method of claim 10 in which the reflectance data processing step includes the steps of:

normalizing and binarizing the reflectance data;

generating binary trace ring data twice eroding the normalized and binarized reflectance data;

merging the binary trace ring data and the reflectance data to generate color trace ring data; and analyzing the color trace ring data to determine a reflected color of the plastic container.

15. A plastic container sorting apparatus, comprising:

a presentation conveyor moving the plastic containers through an inspection zone;

an illumination light source illuminating the plastic containers in the inspection zone to provide a source of reflected light;

a first video camera receiving the reflected light from the plastic containers and generating a stream of reflectance image data;

a background light source having a white light diffuser and a glare shield, the white light diffuser providing a source of background light that is transmitted through the plastic containers, and the glare shield preventing stray light from the background light source from being detected by the first video camera;

a second video camera having a transmittance scanning plane that terminates on the white light diffuser such that the second video camera receives the light transmitted through the plastic containers and generates a stream of transmittance image data;

a reflectance image data processor normalizing and binarizing the stream of reflectance image data to classify the plastic containers into color categories in response to the reflectance image data; and a transmittance image data processor normalizing and binarizing the stream of transmittance image data to classify the plastic containers into opacity categories in response to the transmittance image data.

16. A plastic container sorting apparatus, comprising:

a presentation conveyor moving the plastic containers through an inspection zone;

an illumination light source illuminating the plastic containers in the inspection zone to provide a source of reflected light;

a first video camera receiving the reflected light from the plastic containers and generating a stream of reflectance image data;

a background light source having a white light diffuser providing a source of background light that is transmitted through the plastic containers;

a second video camera having a transmittance scanning plane that terminates on the white light diffuser such that the second video camera receives the light transmitted through the plastic containers and generates a stream of transmittance image data;

a reflectance image data processor normalizing and binarizing the stream of reflectance image data to classify the plastic containers into color categories in response to the reflectance image data; and a transmittance image data processor normalizing and binarizing the stream of transmittance image data to classify the plastic containers into opacity categories in response to the transmittance image data.

17. A plastic container sorting apparatus, comprising:

a presentation conveyor moving the plastic containers through an inspection zone;

a pair of scanning cameras generating respective reflectance and transmittance image data streams in response to light received from the plastic containers in the inspection zone, the reflectance image data including container profile data;

a processor classifying the plastic containers into sorting categories in response to the transmittance and reflectance image data streams;

a substantially smooth surfaced ejection conveyor moving at a rate, receiving the plastic containers from the inspection zone, and conveying the plastic containers to predetermined locations adjacent to the ejection conveyor, each of the predetermined locations being associated with one or more of the sorting categories; and a photoelectric sensor positioned adjacent to at least one of the predetermined locations, the sensor generating a container tracking signal that the processor processes together with the rate and the container profile data to eject particular classified ones of the plastic containers from the predetermined location by directing an air ejector blast at a central portion of the particular classified ones of the plastic containers.

* * * * *